(12) United States Patent
Lohr et al.

(10) Patent No.: US 7,222,541 B2
(45) Date of Patent: May 29, 2007

(54) MEASURING TORSIONAL DISTORTION WITH AN EASILY APPLIED CLIP DEVICE (SAW)

(75) Inventors: Raymond David Lohr, Long Crendon (GB); David Daniel George Vile, Bicester (GB); Mark Lee, Totton (GB)

(73) Assignee: Transense Technologies PLC (GB)

( * ) Notice: Subject to any disclaimer, the term of this patent is extended or adjusted under 35 U.S.C. 154(b) by 123 days.

(21) Appl. No.: 10/528,418

(22) PCT Filed: Sep. 16, 2003

(86) PCT No.: PCT/GB03/03999

§ 371 (c)(1),
(2), (4) Date: Mar. 17, 2005

(87) PCT Pub. No.: WO2004/027365

PCT Pub. Date: Apr. 1, 2004

(65) Prior Publication Data

US 2005/0268729 A1    Dec. 8, 2005

(30) Foreign Application Priority Data

Sep. 18, 2002    (GB)    ................. 0221695.0

(51) Int. Cl.
  *G01N 3/22* (2006.01)
(52) U.S. Cl. ............... 73/847; 73/862.332; 73/862.334
(58) Field of Classification Search ........... 73/862.332, 73/847, 862.334
  See application file for complete search history.

(56) References Cited

U.S. PATENT DOCUMENTS

| | | | |
|---|---|---|---|
| 3,625,053 A | 12/1971 | Laimins | |
| 3,850,030 A | 11/1974 | Adler | |
| 4,281,537 A | 8/1981 | Burbank, III | |
| 5,585,571 A * | 12/1996 | Lonsdale et al. | ...... 73/862.325 |
| 6,067,858 A * | 5/2000 | Clark et al. | ............. 73/504.16 |
| 6,880,404 B2 * | 4/2005 | Uberreiter | .................... 73/706 |
| 2002/0121988 A1 | 9/2002 | Lonsdale et al. | |

FOREIGN PATENT DOCUMENTS

| | | |
|---|---|---|
| DE | 10059917 | 6/2002 |
| WO | WO 01/33180 A1 | 5/2001 |

* cited by examiner

*Primary Examiner*—Edward Lefkowitz
*Assistant Examiner*—Jermaine Jenkins
(74) *Attorney, Agent, or Firm*—Keusey, Tutunjian & Bitetto, P.C.

(57) ABSTRACT

A device for measuring torsional distortion of a body comprises first and second clip portions each having a central part and two legs depending from the central part, each leg having adjacent the free end thereof a groove or projection for engaging a respective projection or groove (14) provided in the body (16) to mount the clip portion the body rotationally fastened therewith. A bridge interconnects the clip portion. The bridge is less stiff than the clip portions whereby relative rotational displacement of the clip portions caused by torsional distortion of the body will cause proportional deflection of the bridge. Means, for example a SAW device (15), are provided for measuring the deflection of the bridge to provide an indication of the torsional distortion which produces the deflection of the bridge. Also (20) for the interior all of a hollow body.

13 Claims, 4 Drawing Sheets

DETAIL A

MEASURING TORSIONAL DISTORTION WITH AN EASILY APPLIED CLIP DEVICE (SAW)

BACKGROUND

1. Technical Field

This invention relates to measuring torsional distortion, and in the preferred embodiment provides a method and device for measuring the distortion in a body which is subject to applied torque. The torsional distortion measured may be used, in known manner, to determine the magnitude of the torque to which the body is subject.

2. Description of Related Art

It has been known for many years to measure the torque to which a body (for example a shaft) is subject by applying one or more strain gauges to the surface of the body and interrogating the output of the strain gauges to provide an indication of torque. In recent years, torque measurement techniques have been substantially improved by the introduction of Surface Acoustic Wave ("SAW") based torque measurement devices (see for example EP-A-05 18900). Such devices have a number of well recognized advantages including high sensitivity and the ability to provide torque measurements without the need for hard wired connections to the SAW device.

Up until now, the conventional technique for mounting torque measuring devices has consisted of preparing the surface of the body whose torsional distortion is to be measured and securing the torque measuring device to the prepared surface. The preparation may consist of a cleaning process subsequent to which the torque measuring device is secured to the cleaned surface by a bonding technique—for example adhesive bonding or soldering. However, many torque measuring devices require a flat surface upon which to be mounted and accordingly the preparation may include the step of providing a flat surface, for example by machining, on the body whose torsional distortion is to be measured, prior to securing the torque measuring device to the prepared flat. These techniques are well recognized as being disadvantageous because of the time and cost involved and because they limit the possibility of retrofitting a torque measuring device to an existing shaft. Further, the mounting of the torque measuring device requires both skilled labor and well defined manufacturing conditions and is accordingly difficult to carry out under field conditions. As a result it is generally necessary to apply torque measuring devices in a factory environment before the body whose torsional distortion is to be measured is mounted in its final use position. As a result the torque measuring device is susceptible to accidental damage during the period between mounting of the torque measuring device and the final positioning of the body whose torsional distortion is to be measured. Finally, existing techniques require the permanent mounting of the torque measuring device on the body whose torsional distortion is to be measured. As a result, if the torque measuring device fails, substantial additional work will be involved in terms of removing the faulty unit before a replacement unit can be installed.

Accordingly, there exists a need for a method and apparatus for measuring torsional distortion of a body which may easily be applied to the body without extensive preparation of the body. The need also arises for such a device which can be applied under field as well as factory conditions and which can be applied by skilled, semi-skilled and unskilled labor. A need also arises for such a device which can readily be removed and replaced in the event that it becomes faulty.

SUMMARY OF THE INVENTION

In accordance with the first aspect of the present invention a device for measuring torsional distortion of a body comprises: first and second clip portions each having a central part and two legs depending from the central part, each leg having adjacent the free end thereof a groove or a projection for engaging a respective projection or groove provided on or in the body to mount to the clip portion on the body rotationally fast therewith; a bridge interconnecting the clip portions, the bridge being less stiff than the clip portions whereby relative rotational displacement of the clip portions caused by torsional distortion of the body will cause proportional deflection of the bridge; and measuring means for measuring the deflection of the bridge.

The preferred embodiment of the invention makes use of clip portions which, using a ridge-and-groove mounting technique, can be mounted rotationally fast with a body whose torsional distortion is to be measured. The clip portions are interconnected by a bridge portion. The bridge portion is less stiff than the clip portions with the result that when the body undergoes torsional distortion, and as a result the clip portions rotate relative to each other about the axis of the applied torsional force, a corresponding proportional deflection of the bridge will occur. The exact mode of deflection of the bridge is complex, but is essentially torsion, which is measured by sensing the tensile and compressive direct strain components of the maximum shear strain, which acts at the center of the bridge at ±45° to the longitudinal axis.

In the preferred embodiment of the invention the means for measuring deflection of the bridge is mounted on the bridge itself and may, for example, comprise a SAW device. If a SAW device is used, suitable excitation and analysis equipment may be located near, but not connected to the SAW device. Such an arrangement is particularly desirable since the measuring device does not need to be hard wired and can accordingly simply be clipped into position for use. If the device becomes faulty or a different range of torsional measurement is required the device can simply be removed by unclipping and replaced with an alternative device.

To facilitate ready application and removal the clips are preferably resiliently deformable so that they can be snapped into and out of engagement with the body.

A particularly simple embodiment of the invention may be fabricated from metal as an integral structure. The structure may be formed by any suitable technique, for example by forming a stamped or machined blank and bending it into the required shape, or by investment casting, or by machining from solid.

In a particular preferred arrangement the ridges are each general V-shaped in transverse cross-section and are formed by substantially flat sides connected by a curved ridge. The curved ridge is, conveniently, a portion of the surface of a cylinder which blends into the flat sides. The grooves are also preferably V-shaped in transverse cross-section and have flat sides which either meet at a line or are connected by a curved surface of a smaller radius than that of the ridges. The included angle of the ridges is preferably less than that of the grooves. With such an arrangement, the ridges will engage the grooves along lines of contract located where the curved ridge blends into the flat sides of the ridges. Such mounting arrangement gives a particularly stable, back-lash free and well defined mounting giving a high level of mechanical stability to the arrangement and accurate interpretation of the deflection of the bridge. In the preferred embodiment of the invention the included angle of the ridges is substantially 60° and the included angle of grooves is substantially 90°.

The invention may be embodied either for use on the exterior surface of a body, in which case the projections are preferably formed on the inwardly facing side of the legs for engagement with the grooves formed in the exterior surface of the body, or for use in a hollow body, in which case the ridges are preferably formed on the outwardly placing sides of the legs for engagement within grooves provided in the walls of a passage provided in the body.

BRIEF DESCRIPTION OF THE DRAWINGS

The invention will be better understood from the following description of preferred embodiments thereof; given by way of example only, reference being had to the accompanying drawings wherein.

DETAILED DESCRIPTION OF PREFERRED EMBODIMENTS

Figure 1:
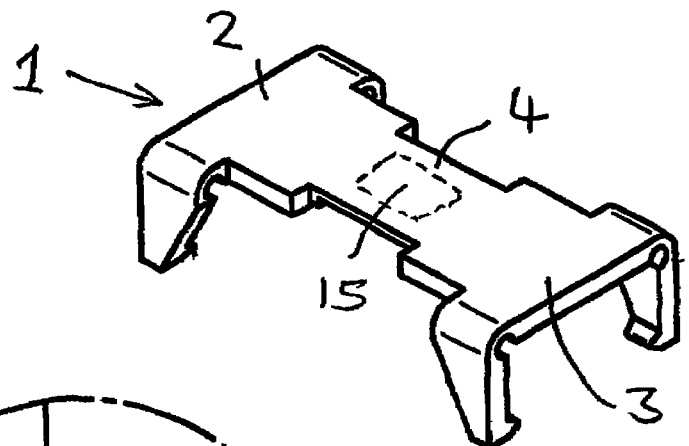
FIG. 1 is a schematic perspective view of a first embodiment of the invention.
Figure 3:
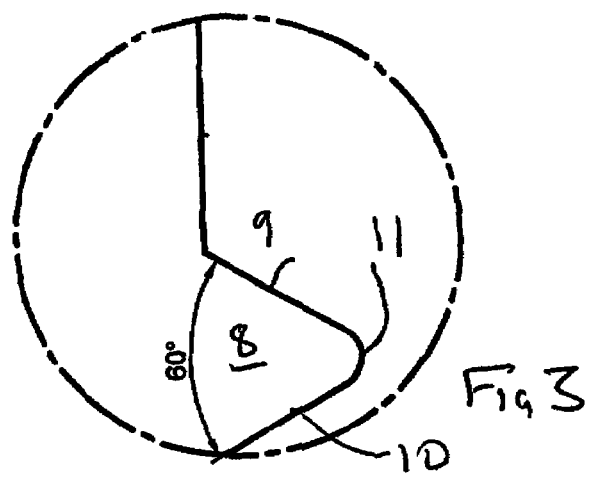
FIG. 3 is a detail of the area marked "A" on FIG. 2.
Figure 2:
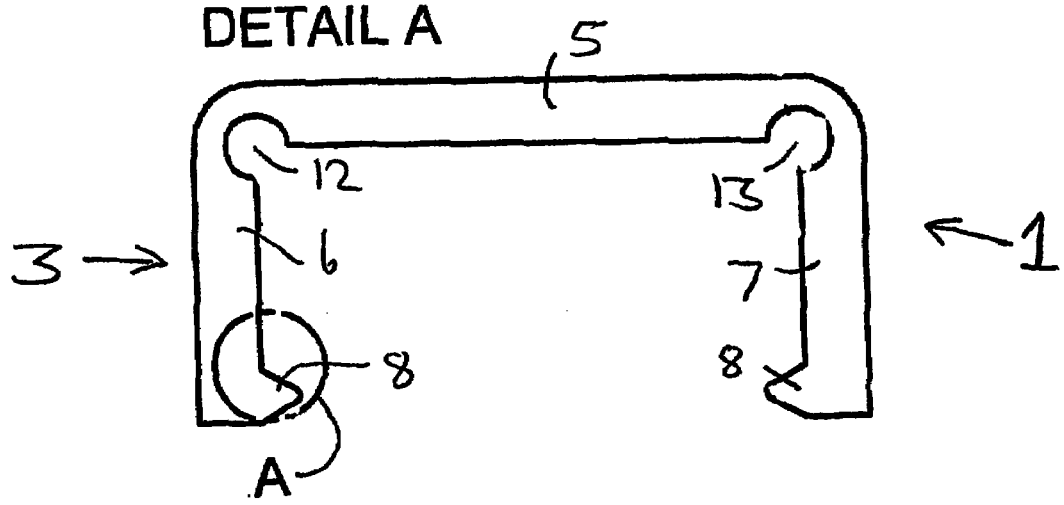
FIG. 2 is an end view of the embodiment of FIG. 1.

Referring firstly to FIGS. 1–3 the illustrated measuring device 1 comprises two clip portions 2,3 interconnected by a bridge portion 4. The illustrated device is an integral metal structure and may be formed by any suitable method, for example by bending a stamped or machined blank, by investment casting, or by machining from solid. The structure is designed such that the bridge 4 is relatively less stiff than the clip portions 2,3 with the result that any distortion of the device caused by mutual relative rotation of the clip portions 2,3 will cause; predominantly, deflection in the bridge 4.

Preferably, the entire structure is resilient so that it will adopt the illustrated configuration in the absence of imposed forces.

Each clip portion 2,3 comprises a central part 5 and two legs 6,7. Each leg has, at the free end thereof, a projection 8. The projections are in the form of ridges which are generally V-shaped in transverse cross-section and are made up of substantially flat sides 9,10 interconnected by a curved ridge 11. The ridge 11 is preferably in the form of a portion of the surface of the cylinder and the flat surfaces 9,10 are tangential to the notional surface of the cylinder of which the ridge 11 forms part.

Figure 4:
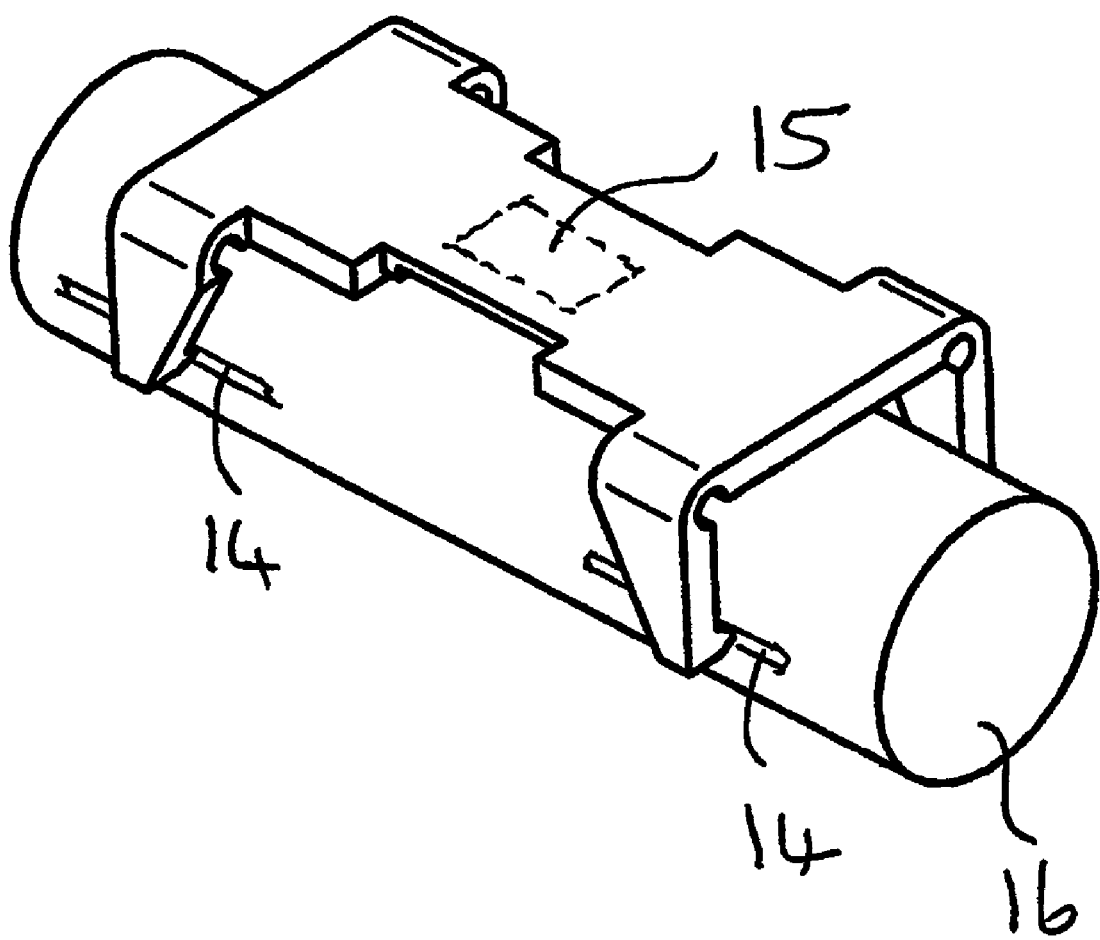
FIG. 4 shows the embodiment of FIGS. 1–3 mounted on a shaft.

Cut-outs 12,13 are preferably provided at the junctures between the legs 6,7 and the central part 5 with the result that the legs 6,7 may be resiliently deflected away from each other to allow the projection 8 to be snap fitted into respective grooves provided on the exterior surface of a body, for example a shaft. FIG. 4 illustrates the measuring device of FIGS. 1–3 so mounted. The grooves 14 in which the projections 8 sit (only two are illustrated in FIG. 4 but there are a corresponding two on the other side of the shaft 16) are also generally V-shaped in transverse cross-section with generally flat sides. In the case of the grooves, however, the flat sides either meet at a line or at a curved surface having a smaller radius than the radius of the curved portion 11 of the ridges. As a result, the ridges are precisely located in the grooves and make contact with the grooves along two lines corresponding generally to the lines at which the flat sides 9,10 meet the curved ridge 11.

The required grooves in the shaft can conveniently be formed by indentation using a suitable tool. Forming the grooves in this manner is relatively simple and the pressing action will result in some protective residual compressive stresses in the zone of the grooves to deter fatigue crack initiation.

While FIG. 4 illustrates only a single device mounted on a shaft 16 it should be appreciated that a plurality of similar devices may be mounted on the shaft utilizing a common set of grooves or adjacent grooves. For example, two devices may be mounted on diametrically opposite sides of the shaft to ensure dynamic balance. In this case, the grooves 14 will be located somewhat offset from a diametric plane through the shaft with a small portion of shaft surface located between each pair of grooves.

Measuring means are provided for measuring the deflection of the bridge caused by relative rotation of the clip portions produced by torsional distortion of the body. The measuring means may be of any suitable type, but in the preferred embodiment comprise one or more SAW devices 15 secured to the bridge to measure deflection thereof. SAW devices have a number of well recognized advantages in the measuring of deflection. One particular advantage of SAW devices is that they are entirely passive (that is they do not require a battery to be connected to them in order to operate) and they can be interrogated by radio signals. Accordingly, provided that suitable excitation and interpretation circuitry is provided somewhere adjacent the device, the device as illustrated in FIG. 1 may be used without any hard wiring to it. This is particularly desirable when a device is used on a shaft which is subject to continuous rotation.

Figure 5:
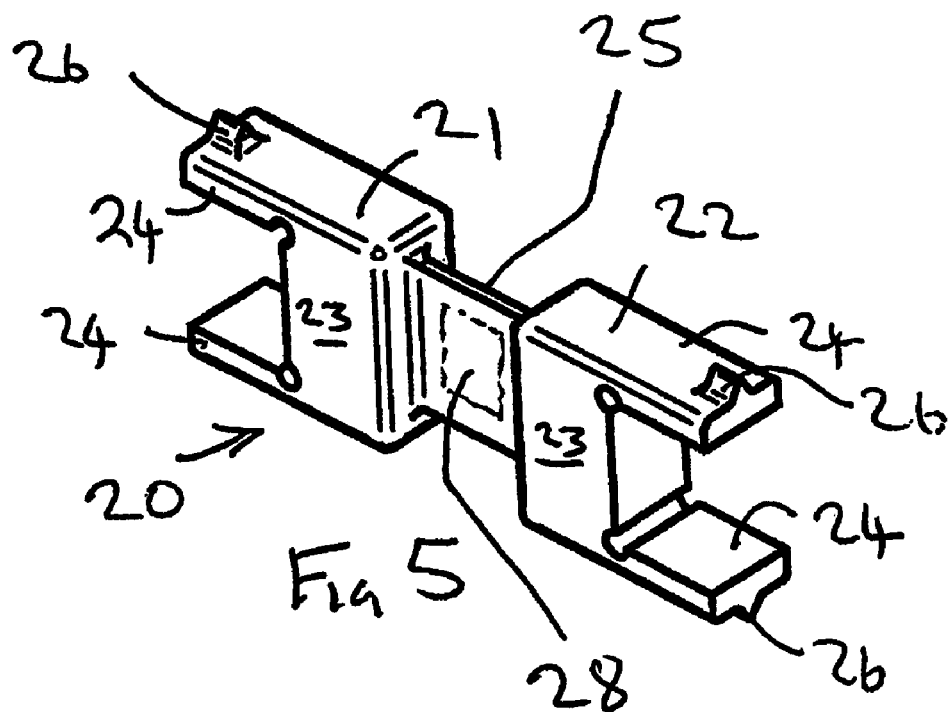
FIG. 5 is a view corresponding to FIG. 1 but showing an embodiment of the invention for use in a hollow body.
Figures 6, 7:
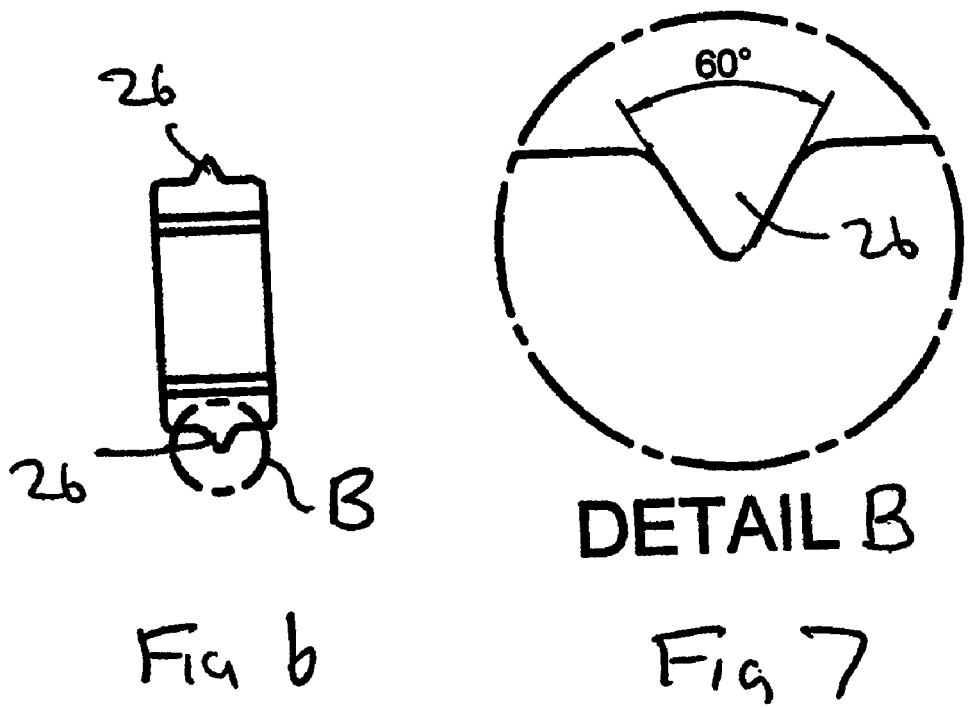
FIG. 6 is an end view of the device of FIG. 5.
FIG. 7 is a detailed view of the area marked "B" in FIG. 6.

Referring now to FIGS. 5–7 an alternative embodiment of the invention is shown. In this case, the measuring device 20 is intended for use in the interior of a hollow body, for example a tubular shaft. The measuring device includes two clip portions 21,22 each of which comprises a central part 23 and two legs 24. The clip portions 21,22 are interconnected by a bridge 25 which is relatively less stiff than the clip portions. In this case, each leg 24 is provided with a projection in the form of a ridge 26 located on the exterior surface thereof for engagement with a corresponding grooves provided in the wall of a hollow body. The profile of the ridges 26 and their associated grooves is as described above with reference to FIGS. 1–4.

Figure 8:
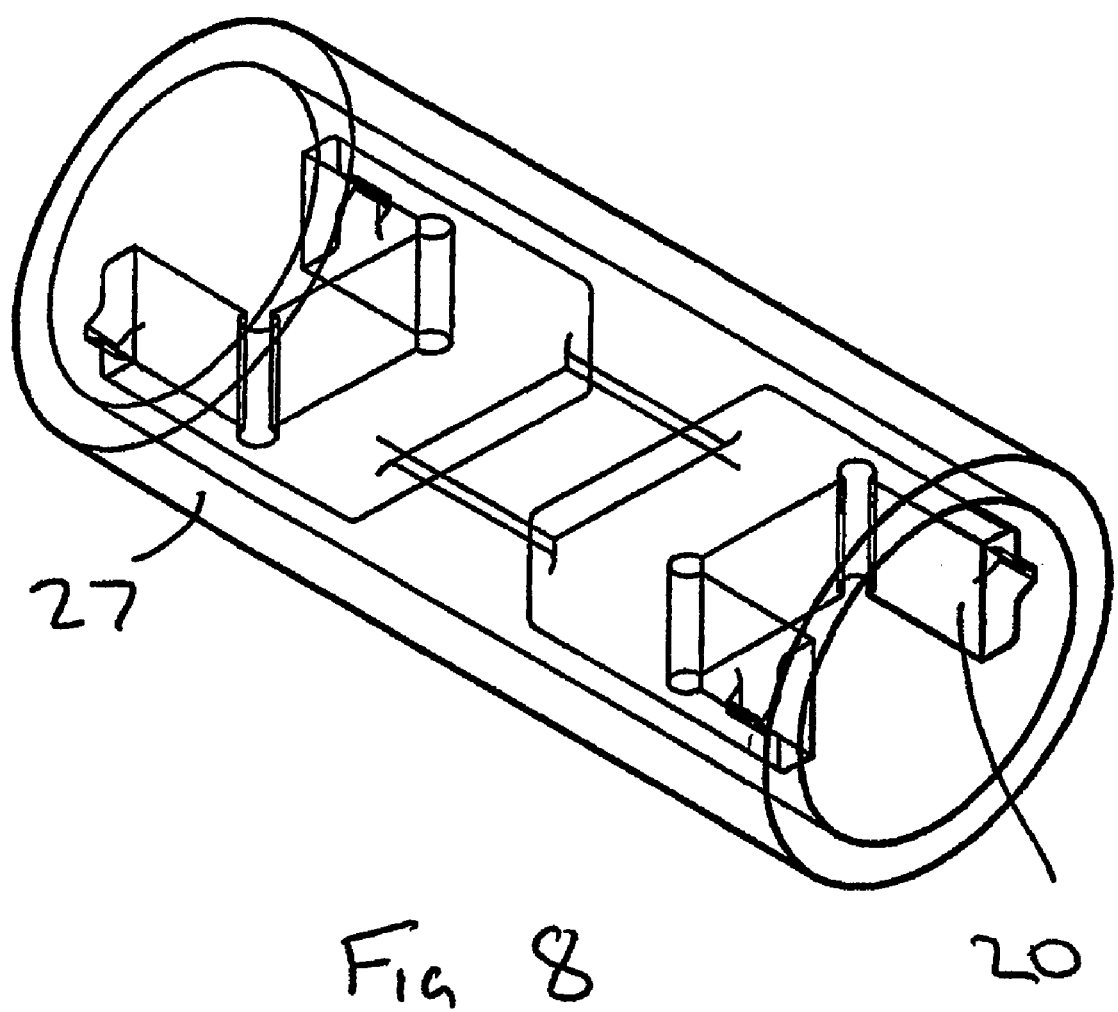
FIG. 8 is a schematic view showing the device of FIG. 5 mounted in a hollow shaft.

FIG. 8 illustrates the measuring device 20 of FIGS. 5–7 mounted internally in a hollow tubular shaft 27.

The device 20 is provided with measuring means 28 for measuring the deflection of the bridge 25. The measuring means are preferably as described above with reference to FIGS. 1–3.

The invention, especially when embodied with a SAW device for measuring deflection of the bridge, forms a self-contained unit which can readily be clipped into engagement with a body, for example a shaft. Although the body in question requires preparation by the formation of grooves, this is a relatively simple and inexpensive operation and grooves can readily be provided as part of the standard manufacturing techniques associated with the body in question. Fitting of the measuring device to the body is a simple matter of clipping the device into position. This can readily be carried out under field conditions by semi-skilled labor. Further, a faulty measuring device can readily be removed and replaced by service staff simply by unclipping one measuring device and replacing it with another. The particular arrangement of ridge and groove described for locating the device ensures stable and precise location of the device leading to a mechanically stable arrangement and accurate interpretation of the output of the bridge deflection measuring device.

The invention claimed is:

1. A device for measuring torsional distortion of a body comprising:
    first and second clip portions, each clip portion having a central part and two legs depending from the central part, each leg having adjacent a free end thereof at least one of a groove or a projection for engaging at least one of a respective projection or groove provided on or in the body to mount the clip portion on the body rotationally fast therewith;
    a bridge interconnecting the first and second clip portions, the bridge being less stiff than the clip portions whereby relative rotational displacement of the clip portions caused by torsional distortion of the body will cause proportional deflection of the bridge; and
    a measuring means for measuring the deflection of the bridge.

2. The measuring device according to claim 1, wherein the measuring means includes means for sensing tensile and compressive direct strain components of a maximum shear strain, which acts at the center of the bridge at ±45° to a longitudinal axis.

3. The measuring device according to claim 2 wherein the means for measuring deflection is a SAW device.

4. The measuring device according to claim 1 wherein the means for measuring deflection of the bridge is mounted on the bridge.

5. The measuring device according to claim 1, wherein the clip portions and the bridge are an integral structure.

6. The measuring device according to claim 1, wherein the projections are ridges which are generally V-shaped in transverse cross-section and have substantially flat sides connected to each other by a curved ridge.

7. The measuring device according to claim 6, wherein the grooves are generally V-shaped in transverse cross-section and have generally flat sides.

8. The measuring device according to claim 7, wherein an included angle of the ridges is less than an included angle of the grooves, and the grooves and ridges are shaped so that each ridge engages each groove along two lines of contacts spaced from a base of the groove.

9. The measuring device according to claim 8, wherein the included angle of the ridges is substantially 60° and the included angle of the grooves is substantially 90°.

10. The measuring device according to claim 1, in which the clip portions are resiliently deformable to allow the clip portions to be snapped into engagement with the grooves.

11. The measuring device according to claim 1, wherein the projections are on the legs and faced inwardly so that the clip portions may be mounted on grooves provided on the external surface of a shaft.

12. The measuring device according to claim 1, wherein the projections are on the legs and face outwardly so that the clip portions may engage grooves provided in the interior wall of a hollow body.

13. The measuring device according to claim 1, wherein the clip portions and the bridge comprise an integral metal structure.

* * * * *